United States Patent [19]

Hill

[11] 3,740,678

[45] June 19, 1973

[54] STRIP TRANSMISSION LINE STRUCTURES

[75] Inventor: Yates M. Hill, Endicott, N.Y.

[73] Assignee: International Business Machines Corporation, Armonk, N.Y.

[22] Filed: Mar. 19, 1971

[21] Appl. No.: 125,971

[52] U.S. Cl..... 333/84 M, 174/117 FF, 17/101 CM

[51] Int. Cl............................................... H01p 3/08

[58] Field of Search................................ 333/84 M; 317/101 CM; 340/174 GP; 174/117 FF, 117 PC, 68.5; 156/309; 29/625

[56] References Cited

UNITED STATES PATENTS

| | | | |
|---|---|---|---|
| 3,568,000 | 3/1971 | D'Aboville | 317/101 CM |
| 3,680,005 | 7/1972 | Jorgensen et al. | 333/84 M |
| 2,810,892 | 10/1957 | Blitz | 333/84 M |
| 3,057,952 | 10/1962 | Gordon | 174/117 FF |
| 3,104,363 | 9/1963 | Butler | 333/84 R |
| 3,157,857 | 11/1964 | Stapper, Jr. et al. | 317/101 CM X |
| 3,303,439 | 2/1967 | Fulp | 333/84 |
| 3,408,453 | 10/1968 | Shelton, Jr. | 174/117 A X |
| 3,436,819 | 4/1969 | Lunine | 317/101 CM X |
| 3,508,330 | 4/1970 | Kubik | 317/101 CM X |
| 3,612,744 | 10/1971 | Thomas | 174/117 FF X |

OTHER PUBLICATIONS

H. E. Brenner, "Use a Computer to Design Suspended-Substrate ICs", Microwaves, 9-1968, pp. 38-43.

E. Yamashita, "Variational Method for the Analysis of Microstrip-Like Transmission Lines," MTT-16, 8-1968, pp. 529-535.

Yamashita-Yamazaki, "Parallel-Strip Line Embedded in or Printed on a Dielectric Sheet," MTT-16, 1968, pp. 972-973.

Yamashita-Atsuki, "Design of Transmission-Line Dimensions for a Given Characteristic Impedance," MTT-17, 8-1969, pp. 638-639.

S. B. Cohn, "Shielded Coupled-Strip Transmission Line" MTT-3, 10-1955, pp. 29-38.

Hill et al., "A General Method for Obtaining Impedance & Coupling Characteristics of Practical Microstrip & Triplate Transmission Line Configurations," IBM J. Res. & Develop. 5-1969, pp. 314-322.

Archer et al., "Reinforcement of Printed Circuits," IBM Technical Disclosure Bulletin, Vol. 13, No. 8, 1-1971, pp. 2296.

*Primary Examiner*—Rudolph V. Rolinec
*Assistant Examiner*—Wm. H. Punter
*Attorney*—Hanifin and Jancin and Charles S. Neave

[57] ABSTRACT

Strip transmission line structures which feature multilayer compositions with FEP (fluorinated ethylene propylene) Teflon* (Trademark, E. I. du Pont de Nemours & Co., Inc.) and Epoxy Glass (EG) as the dielectric materials. The fabrication with FEP material having substantially lower dielectric constant (Er) than commonly used Epoxy Glass enables the provision of high performance transmission lines of simplified construction with superior characteristics designed to meet the microminiaturization of current technological developments and adapted for use in present day computer systems. Retention of some Epoxy-Glass promotes fabrication without a major sacrifice in performance. The strip transmission lines having the more commonly used characteristic impedances (Zo) of 50 to 90 ohms are disclosed.

4 Claims, 6 Drawing Figures

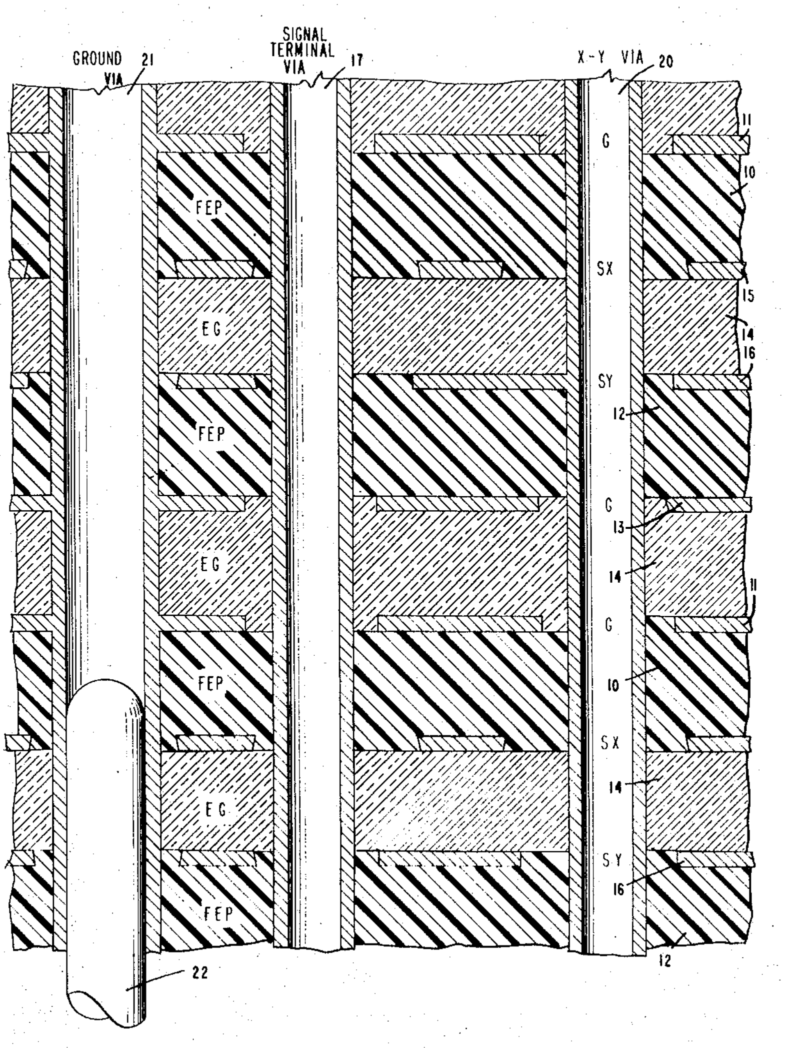
GROUND VIA
21
SIGNAL TERMINAL VIA
17
X-Y VIA
20
G
SX
SY
G
G
SX
SY
FEP
EG
FEP
EG
FEP
EG
FEP
11
10
15
14
16
12
13
14
11
10
14
16
12
22

INVENTOR
YATES M. HILL
BY [signature]
AGENT

STRIP TRANSMISSION LINE STRUCTURES

BACKGROUND OF THE INVENTION

1. Field of the Invention

This invention relates to strip transmission line structures, and more particularly, to improved structure configurations which function as strip transmission lines having improved electrical and manufacturing characteristics.

2. Description of the Prior Art

If computer systems are to benefit fully from the latest increases in integrated circuit speeds, the wiring delays between circuits must be reduced. The present day ultrahigh-speed IC's (integrated circuits) have switching times and propagation delays of approximately 1 nanosecond or less. This speed cannot be used effectively in a system if wiring delays between circuits are dominant. With commonly used Epoxy Glass a 6 inches connection has a delay of 1 nsec.

To reduce the wiring length, thus reducing wiring delays, requires structures with a high density of interconnections. However, even with such microinterconnection structures, transmission-line considerations such as line impedances, load reflections and signal cross-coupling must be applied to the wiring design because the new circuits are so fast. Crosstalk must be considered more exhaustively because it takes less spurious energy to falsely switch the faster circuits. Also, increasing the density of interconnections generally increases the coupling which in turn increases the crosstalk.

Still another problem is created by the present day trend in data processing systems that is to microminiaturization which involves higher density packaging within smaller volumetric spaces. This trend introduces problems such as maintaining uniform characteristic impedances while trying to reduce the package size.

While transmission lines made by multilayer printed circuit techniques are a reliable means of transmitting high-frequency signals, there are also several aspects of the laminating operations which must be taken into consideration. Among the laminating factors which may be of critical importance are the registration of layers, thickness between layers, and total overall thickness, as well as the warp and twist characteristics of conductors and of the total circuit board structure due to pressure and/or temperatures applied during the laminating processes of the materials.

SUMMARY OF THE INVENTION

In accordance with the invention, there is provided triplate strip transmission line constructions capable of efficiently transmitting high-frequency signals within a data processing system. These strip transmission line constructions are particularly adapted to meet the microminiaturization requirements of the current technological developments.

The strip line constructions feature the use of two different materials as the dielectric mediums. The base or core is a material such as Epoxy Glass (EG) ($Er = 4.4$) or polyimide ($Er = 3.5$), either of which has a substantially different melting or softening temperature than the second material, and which is used to provide the construction with mechanical stability during construction. The outer dielectric layers use a relatively low *Er* material such as FEP Teflon ($Er = 2.1$) or polyethylene ($Er = 2.35$) which provides the more desirable electrical characteristics. Because the melting points are different in inner and outer layers, lamination and control of conductor positions are improved. The offset triplate structuring enables the concurrent transmission of signals in both X and Y planes, thereby permitting orthogonal transmissions without significant coupling and also permitting the interconnnection of arbitrary terminals on the board.

It is a principal object of the instant invention to enable the fabrication of multilayer strip transmission lines utilizing composite dielectric materials having Er or (dielectric constants) to realize structural and performance advantages.

It is another object of the present invention to provide a facile technique for producing strip transmission lines.

It is another object of the present invention to provide a strip transmission line having a duel-dielectric construction.

It is a further object to provide strip transmission lines having substantially uniform impedance, thinner structure, improved delay, and decreased crosstalk characteristics.

The foregoing and other objects, features and advantage of the invention will be apparent from the following more particular description of preferred embodiment of the invention, as illustrated in the accompanying drawings.

DESCRIPTION OF THE PREFERRED EMBODIMENTS

Figure 1:
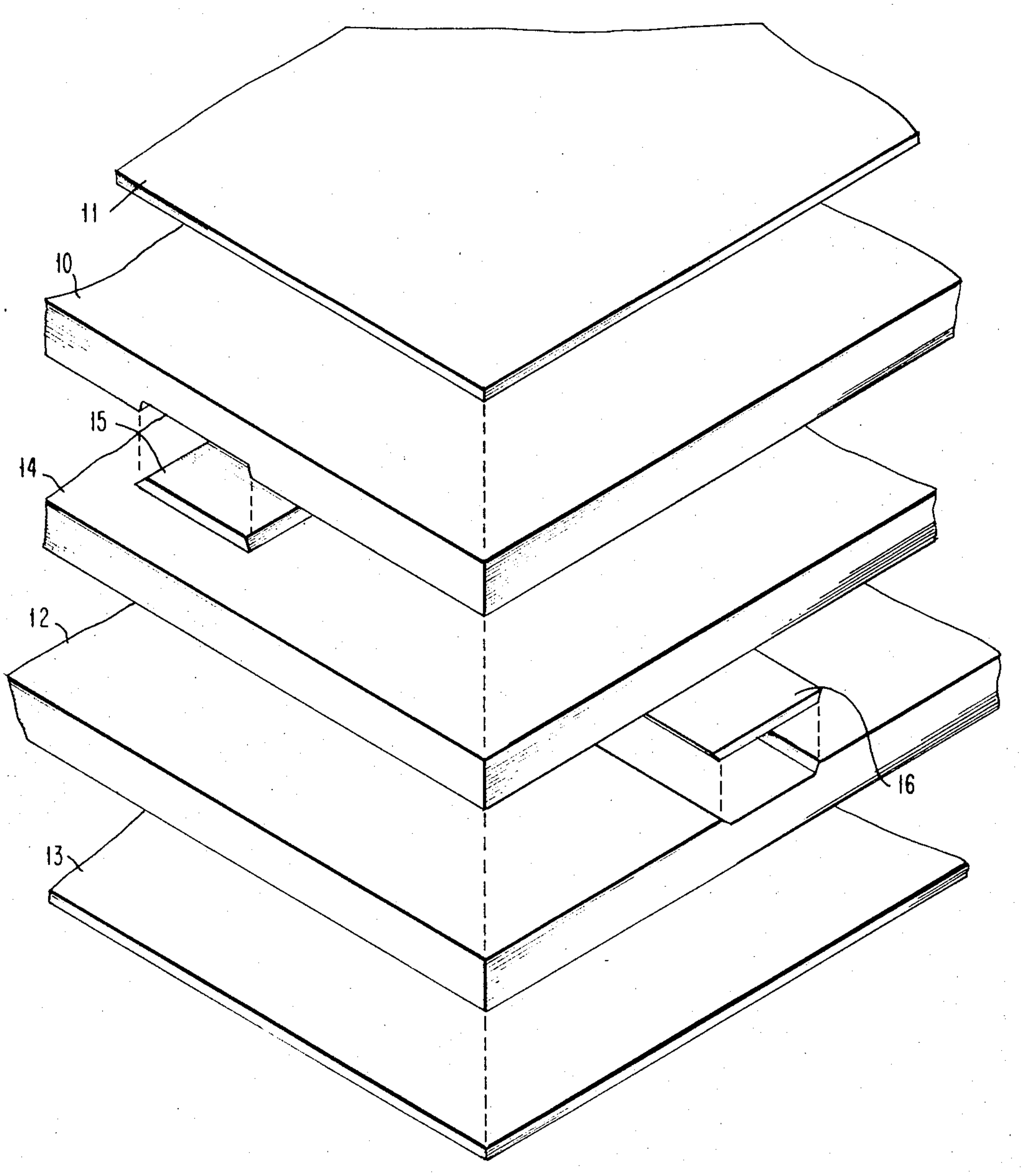
FIG. 1 is an exploded isometric view of a triplate strip transmission line constructed according to the present invention.

Referring to FIG. 1, there is shown the structuring for a triplate strip transmission line which comprises a first dielectric member 10 to which is bonded a ground plane or ground conductor element 11, a second dielectric member 12 also having a ground plane or ground conductor element 13 bonded thereto, and a third dielectric member 14 having an X plane signal element of elements 15 bonded to one side thereof and a Y plane signal element or elements 16 bonded to the other side thereof. The middle dielectric member 14 is sandwiched between the two outer dielectric members 10 and 12 and held together by bonding under heat and pressure and utilizing a thin film of resin. Connections to the triplate strip line can be made either at the edge of the package or desirable locations intermediate thereof.

Experimentation has shown that the construction can be favorably done by at least two methods. In the first fabricating process, the start is made with an Epoxy glass (EG) dielectric member 14 with material of the proper thickness (in the preferred embodiment the member has a thickness of 4 mils). A 0.5 oz. copper foil is then bonded to both sides of the Epoxy Glass dielectric material. Then, by chemical procedures which are well known in the printed circuit art, the X and Y plane signal lines 15 and 16 can be etched and formed. This is followed by the laminating of 3 mil thick FEP Teflon members 10 and 12 to both sides of the Epoxy Glass and signal line structures 14, 15, and 16. In the same step, copper foil ground planes 11 and 13 are laminated to the FEP Teflon dielectric members 10 and 12, respectively, and bondingly attached thereto by utilization of a resin or by heat alone.

Figure 2:
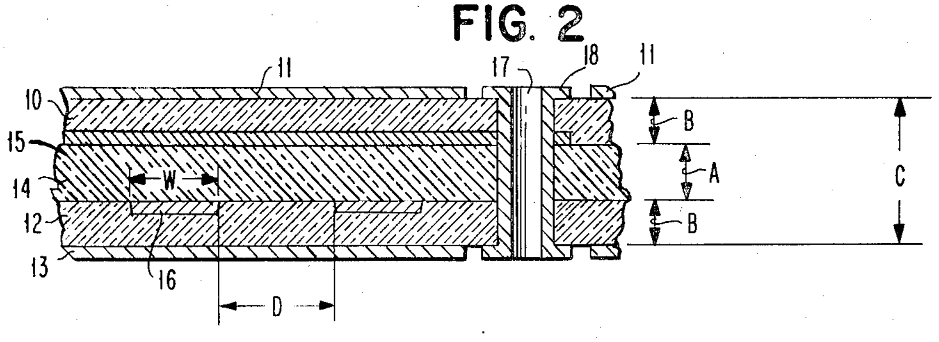
FIG. 2 is a typical cross-sectional view of a triplate strip transmission line constructed according to the instant invention.

Referring to FIG. 2, electrical connections to the inner conductive signal elements 15 and 16 of the laminar structure can be effected by drilling a hole in the sandwich-like structure and then conductively plating the inner portions of the signal "via" hole 17 by suitable electroplating means. A "donut" type connecting area 18 can be etched around the signal "vias" 17 to facilitate the electrical connecting operations.

Alternatively, and with reference to FIG. 1, the second method for fabricating a triplate strip transmission line starts with two FEP Teflon dielectric members 10 and 12 each provided with 0.5 oz. copper foil bonded to both sides to function as ground planes 11 and 13. One side of the one FEP Teflon member 10 is etched to form X plane signal lines 15 and the other member 12 is etched to form Y plane signal lines 16. A triplate strip transmission line can then be fabricated by laminating with a 4 mil thick uncured Epoxy Glass (EG) member 14 between the FEP Teflon dielectric members 10 and 12 followed by a curing operation. In a similar manner, "via" signal holes 17 (FIG. 2) can be drilled, plated and etched to provide electrical interconnecting means.

Figure 3:
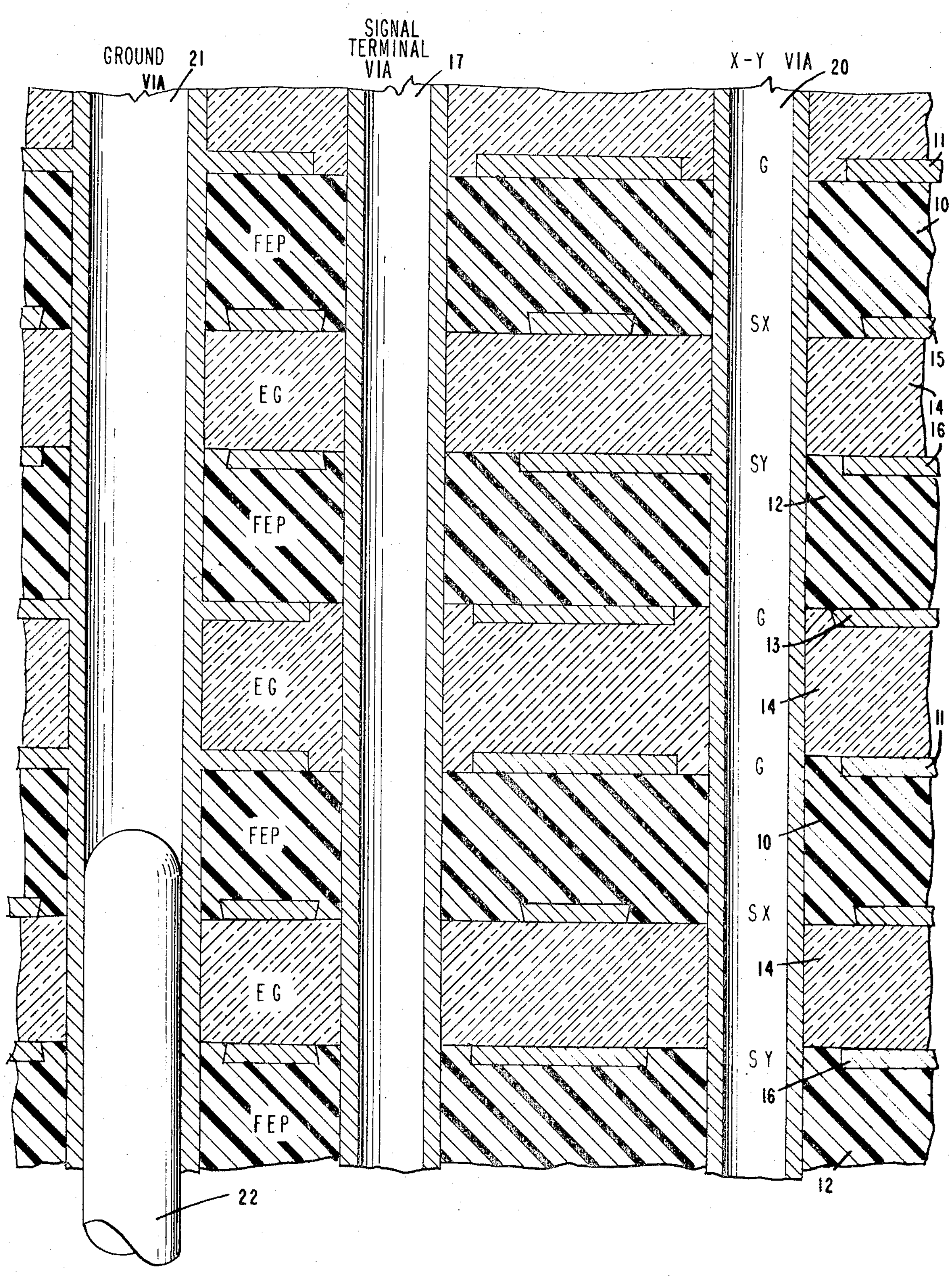
FIG. 3 is a cross-sectional view of a multilayered triplate circuit board line construction.

FIG. 3 is a partial cross-sectional view of a multilayered triplate circuit board line construction in accordance with the present invention. This is a stacked structuring of the triplate strip transmission line shown in FIG. 2. The interplanar connections are made by way of the *x–y* signal vias 20. A signal terminal can be electrically interconnected to an appropriate planar conductive element by way of a signal terminal via 17. The ground planes are coupled to the ground via 21 which is in turn connected with a ground pin 22. This facilitates the external ground connection to the ground planes of multilayered triplate circuit board.

Certain basic principles are common to all strip transmission line structures. A knowledge of these principles is needed to understand why circuit performance depends to a large extent on the reproducible dielectric properties and dimensions. For example, when the dielectric is a solid and not air, the speed or velocity of propagation at which an electrical wave travels along the transmission line is reduced and so, also, is the wavelength. The dielectric constant controls the velocity of propagation in a strip transmission line structure. In this context non-magnetic materials, i.e., permeability, $\mu = 1$ is assumed. For a desired impedance characteristic, strip transmission line circuit elements are required to have certain physical and dimensional relationships. One way to reduce a required thickness of the triplate transmission line structure is to decrease the dielectric constant Er. Although this appears obvious, decreasing the thickness has to be done without sacrificing other desirable features such as low line resistance. This has not proven easy to do. Control of the dielectric constant Er is a basic and essential requirement.

The dielectric constant Er is a critical property for all strip transmission line application. However, the thickness of the dielectric is of equal importance. Thickness affects the "characteristic impedance" *Z0* which is a fundamental design parameter for all strip transmission line circuits. The characteristic impedance *Zo* depends on the dielectric constant Er of the dielectric, on the width and thickness of the signal conductor strips, and on he thickness of the dielectric layers.

In strip transmission line structures it is necessary to feed signals effeciently into and out of the structure and through the various component elements. The desired characteristic impedances *Zo* for strip transmission lines are usually in the range of 30 to 100 ohms. The characteristic impedance of strip transmission lines can be determined by means of suitable computer programs which take into account conductor boundaries, dielectric interfaces, and dielectric constants. An early version of a suitable program is described in the IBM Research and Development Journal, May 1969, pages 314 – 322.

Through use of the program, the geometrical dimensions and dielectric constants can be chosen so as to achieve desired impedances, as well as to explore effects of changes in each parameter. The characteristic impedance is very sensitive to any changes in the dielectric thickness, conductor dimensions, and dielectric constants.

Another design consideration is the cross-talk characteristics. Crosstalk is the undesirable coupling of energy between the signal paths. This unwanted transfer of energy between the signal lines results from the capacitive and inductive coupling between the signal lines and is a function of the length of the lines and space between them, and the dielectric constant. Again through use of the above-mentioned computer program, one skilled in the art can compute coupling coefficients and control crosstalk.

FIG. 2 is a typical cross-sectional view of a triplate strip transmission line structure featuring dual dielectric construction. The following table illustrates the structural thickness advantages for strip transmission lines having a characteristic impedance *Zo* of 50 ohms and also 90 ohms. The conductor width W is 4 mils and thickness is 0.7 mils (½ oz. Cu) in all cases.

50 ohm line

| Dimension | Dual-Dielectric (FEP and E/G) | All EG |
|---|---|---|
| A | 4 mils | 4 mils |
| B | 3 mils | 4 mils |
| C (overall) | 10 mils | 12 mils |
| D | 3.5 mils | 5 mils |
| | 90 ohm line | |
| A | 4 mils | 4 mils |
| B | 12 mils | 26 mils |
| C (overall) | 28 mils | 56 mils |
| D | 11 mils | 20 mils |

To illustrate how critical some of the dimensions are, the above invention computer program was used to generate the following table of impedance sensitivities for the 50 ohm dual-dielectric structure.

$$(\delta Zo/\delta W)\ W = 4 = 5 \text{ ohm/mil}$$

$$(\delta Zo/\delta B)\ B = 3 = 10 \text{ ohm/mil}$$

$$(\delta Zo/\delta A)\ A = 4 = 1.0 \text{ ohm/mil}$$

where $W$ is the conductor width and $A$ and $B$ are the Epoxy Glass and FEP thicknesses, respectively, as indicated in FIG. 2.

Figures 5, 6:
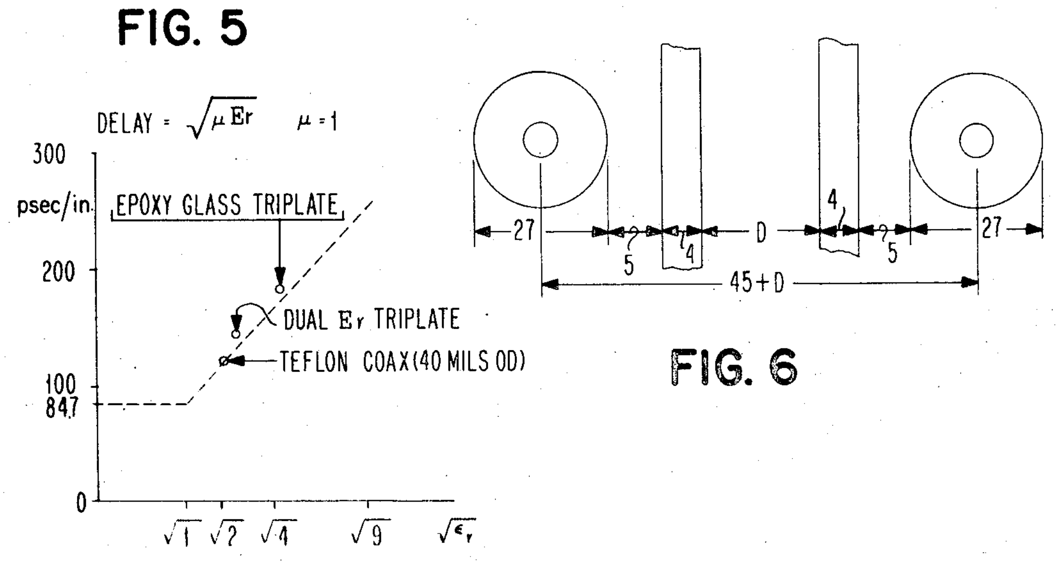
FIG. 5 illustrates how transmission delay can be affected by the choice of materials having a different dielectric constant.
FIG. 6 is a plan view to illustrate the tighter or closer line spacing advantages which are obtainable in a 90 ohm strip transmission line structure utilizing dual dielectric materials.

FIG. 5 indicates how the transmission delay characteristics can be affected by the choice of materials having a different dielectric constant Er.

Figure 4:
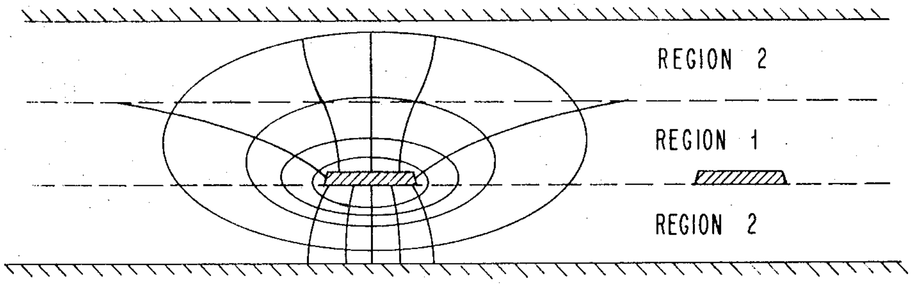
FIG. 4 is an illustrative showing of the electrical effects caused by the change of dielectric material.

FIG. 4 indicates in a strip transmission line structure where the energy density is greatest (region 2) and where the greatest impact of a dielectric change will result. It is here that the FEP Teflon is to be substituted for an Epoxy Glass material. Also, to maintain the characteristic impedance $Zo$, the line/ground plane spacings are reduced. This enables a reduction in the crosstalk characteristics particularly for 90 ohm structures. In other words, $D = 11$ mils, the line-to-line separation can be used for the same crosstalk levels in Dual Er as obtainable when a 20 mil separation with all-epoxy glass dielectric material is used. As a result of the unique structuring, the triplate overall thickness for 90 ohm characteristic impedance is reduced from 56 to 28 mils. This results in a double packaging advantage. The spacing, 45 +D, between board terminals can be reduced as D is reduced from 20 to 11 as indicated in FIG. 6, and also the velocity of propagation is increased thereby compounding performance advantages. In a typical application, the spacing ratio can be improved by 65 mils/56 mils and the delay ratio by 185 psec./in./145 psec./in. Therefore the net gain is the product of the ratios or 1.48. At the same time, series resistance and crosstalk has remained constant.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A triplate strip transmission line structure comprising, in combination:

a. a dielectric core member of a polyimide material characterized by a relatively high dielectric constant in the order of about 3.5 to 4.4 and having a predetermined thickness depending upon the dielectric constant of the material utilized, b. a plurality of flat conductive X plane signal elements of predetermined cross-sectional area depending upon the signal to be transmitted over the signal elements and arranged in a parallel array affixed to one side of the dielectric core member, c. a plurality of flat conductive Y plane signal elements of predetermined cross-sectional area depending upon the signals to be transmitted over the signal elements and arranged in a parallel array affixed to the other side of the dielectric core member, d. a second and third dielectric member of polyethylene type material characterized by a relatively low dielectric constant in the order of about 2.1 to 2.35 and positioned contiguously to each side of the dielectric core member to which the signal elements are affixed, e. a layer of thin conductive foil attached to the outermost surface of each of the second and third dielectric members and adapted to function as the ground planes of the strip transmission line structure, and f. whereby each of the signal line conductor elements in combination with a ground conductor plane is adapted to functionally operate as a transmission line possessing substantially uniform impedance characteristics with the complete transmission line structure enabling concurrent orthogonal signal transmissions and crosstalk suppression between different planar signal elements is a function of the thickness of said dielectric core member.

2. A triplate strip transmission line structure comprising, in combination:

a. a dielectric core member of epoxy glass material characterized by a relatively high dielectric constant in the order of about 3.5 to 4.4 and having a predetermined thickness depending upon the dielectric constant of the material utilized, b. at least one flat conductive X plane signal element of predetermined cross-sectional area depending upon the signal to be transmitted over the signal element and affixed to one side of the dielectric core member, c. at least one flat conductive Y plane signal element of predetermined cross-sectional area depending upon the signals to be transmitted over the signal element and affixed to the other side of the dielectric core member, d. a second and third dielectric member of FEP Teflon type material characterized by a relatively low dielectric constant in the order of about 2.1 to 2.35 and positioned contiguously to each side of the dielectric core member to which the signal elements are affixed, e. a layer of thin conductive foil attached to the outermost surface of each of the second and third dielectric members and adapted to function as the ground planes of the strip transmission line structure, and f. whereby each of the signal line conductor elements in combination with a ground conductor plane is adapted to functionally operate as a transmission line possessing substantially uniform impedance characteristics with the complete transmission line structure enabling concurrent orthogonal signal transmissions and crosstalk suppression between different planar signal elements is a function of the thickness of said dielectric core member.

3. A triplate strip transmission line structure comprising, in combination;

a. dielectric core member of epoxy glass material characterized by a relatively high dielectric in the order of about 3.5 to 4.4 and having a predetermined thickness depending upon the dielectric constant of the material utilized, b. at least one flat conductive X plane signal element of predetermined cross-sectional area depending upon the signals to be transmitted over the signal element and affixed to one side of the dielectric core member, c. at least one flat conductive Y plane signal element of predetermined cross-sectional area depending upon the signal to be transmitted over the signal elements and arranged in a parallel array affixed to the other side of the dielectric core member, d. a second and third dielectric member of polyethylene type material characterized by a relatively low dielectric constant in the order of about 2.1 to 2.35 and positioned contiguously to each side of the dielectric core member to which the signal elements are affixed, e. a layer of thin conductive foil attached to the outermost surface of each of the second and third dielectric members and adapted to function as the ground planes of the strip transmission line structure, and f. whereby each of the signal line conductor elements in combination with a ground conductor plane is adapted to functionally operate as a transmission line possessing substantially uniform impedance characteristics with the complete transmission line structure enabling concurrent orthogonal signal transmissions and crosstalk suppression between different planar signal elements is a function of the thickness of said dielectric core member.

4. A triplate strip transmission line structure comprising, in combination:

a. a dielectric core member of a polyimide material characterized by a relatively high dielectric constant in the order of about 3.5 to 4.4 and having a predetermined thickness depending upon the dielectric constant of the material utilized, b. a plurality of flat conductive X plane signal elements of predetermined cross-sectional area depending upon the signals to be transmitted over the signal elements and arranged in a parallel array affixed to one side of the dielectric core member, c. a plurality of flat conductive Y plane signal elements of predetermined cross-sectional area depending upon the signals to be transmitted over the signal elements and arranged in a parallel array affixed to the other side of the dielectric core member, d. a second and third dielectric material of FEP Teflon type material characterized by a relatively low dielectric constant in the order of about 2.1 to 2.35 and positioned contiguously to each side of the dielectric core member to which the signal elements are affixed, e. a layer of thin conductive foil attached to the outermost surface of each of the second and third dielectric members and adapted to function as the ground planes of the strip transmission line structure, and f. whereby each of the signal line conductor elements in combination with a ground conductor plane is adapted to functionally operate as a transmission line possessing substantially uniform impedance characteristics with the complete transmission line structure enabling concurrent orthogonal signal transmissions and crosstalk suppression between different planar signal elements is a function of the thickness of said dielectric core member.

* * * * *